United States Patent
Kyles et al.

(10) Patent No.: US 6,413,435 B1
(45) Date of Patent: Jul. 2, 2002

(54) SEPARATOR UNIT CAPABLE OF LESS-DENSE SOLIDS AND/OR BUOYANT SOLIDS REMOVAL

(75) Inventors: Bruce W. Kyles; William C. Batten, both of Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 0 days.

(21) Appl. No.: 09/667,991

(22) Filed: Sep. 22, 2000

(51) Int. Cl.[7] .................................................. C02F 1/40
(52) U.S. Cl. ........................ 210/800; 210/805; 210/739; 210/103; 210/109; 210/136; 210/143; 210/167; 210/194; 210/532.1; 210/538; 210/539; 210/540
(58) Field of Search ................................ 210/538, 539, 210/540, 800, 801, 802, 803, 805, 739, 103, 109, 136, 143, 167, 194, 532.1

(56) References Cited

U.S. PATENT DOCUMENTS

| | | | |
|---|---|---|---|
| 1,159,044 A | 11/1915 | Kelly, Jr. | |
| 1,164,527 A | * 12/1915 | Kelly, Jr. | .................... 210/540 |
| 1,200,951 A | 10/1916 | Kelly, Jr. | |
| 1,864,511 A | 6/1932 | Jones | |
| 3,225,936 A | 12/1965 | Ballestra | ..................... 210/519 |
| 4,088,578 A | 5/1978 | Yoshioka et al. | |
| 4,149,973 A | 4/1979 | Harris | ......................... 210/305 |
| 4,400,274 A | 8/1983 | Protos | ......................... 210/302 |
| 4,554,074 A | 11/1985 | Broughton | .................. 210/519 |
| 4,994,179 A | 2/1991 | Keeter et al. | ............ 210/195.1 |
| 5,405,538 A | 4/1995 | Batten | ......................... 210/744 |
| 5,492,619 A | 2/1996 | Batten | ......................... 210/86 |
| 5,554,301 A | 9/1996 | Rippetoe et al. | ............ 210/748 |
| 5,705,055 A | 1/1998 | Holloway, Jr. et al. | ..... 210/115 |
| 5,714,069 A | 2/1998 | Sager | ......................... 210/519 |
| 5,827,425 A | 10/1998 | McKinnon | ................... 210/194 |
| 5,840,198 A | 11/1998 | Clarke | ......................... 210/802 |
| 5,861,098 A | 1/1999 | Morrison | ..................... 210/774 |

* cited by examiner

Primary Examiner—Robert Popovics
(74) Attorney, Agent, or Firm—MacCord Mason PLLC (57) ABSTRACT

An apparatus for separating or segregating an insoluble or immiscible fluid mixture including less-dense solids and/or buoyant solids into its denser component, less-dense component, and less-dense solids and/or buoyant solids is disclosed. An aspect of the invention is directed to a technique that may relieve and even eliminate the fouling of down stream elements through the use of a flushing cycle in one instance, alternative access lines in another instance, or alternative access lines and flushing in yet another instance. The apparatus may be advantageously used to separate grease/water mixtures of commercial food preparation operations into a gray water component for disposal in sewer lines and a grease component for storage and subsequent appropriate disposal.

28 Claims, 4 Drawing Sheets

SEPARATOR UNIT CAPABLE OF LESS-DENSE SOLIDS AND/OR BUOYANT SOLIDS REMOVAL

BACKGROUND OF THE INVENTION

This invention pertains to a separator unit capable of substantially separating a mixture of insoluble or immiscible fluids including less-dense solids and/or buoyant solids into a less-dense component, a denser component and the less-dense solids and/or buoyant solids. Also, this invention pertains to integrating a separator unit into a system that involves a mixture of insoluble or immiscible fluids to substantially separate the fluid mixture into its components as well as the less-dense solids and/or buoyant solids. The separator unit may be used in a commercial food preparation operation to substantially separate a grease/water mixture containing, for example, plastic and/or paper fragments. A gray water component of the grease/water mixture may be directly disposed into a sewer line. A plastic and/or paper fragments component of the grease/water mixture also may be removed from a surface of a grease component to minimize and optimally prevent equipment fouling, then be stored and subsequently appropriately disposed. The grease component of the grease/water mixture then may be removed, stored and subsequently appropriately disposed.

Grease/water mixtures disposed directly into sewer lines burden municipal sewage systems since the grease builds up in sewer lines and on equipment in sewage treatment plants. To offset maintenance costs resulting from direct grease discharges into municipal sewers, municipal authorities surcharge commercial food preparation operations that directly discharge grease/water mixtures. Commercial operations take steps to alleviate such sewage surcharges by including a separator unit in the sewer line to divert the grease to other acceptable facilities for eventual appropriate disposal.

The art is replete with examples of devices for separating insoluble or immiscible fluid mixtures into their components. Although such devices may be effective in separating insoluble or immiscible fluid mixtures into their components, they lack serviceability.

A particularly popular and effective separator has been the Big Dipper® separator sold by Thermaco, Inc. of Asheboro, N.C., U.S.A. It uses a rotating oleophilic wheel to pull grease from the top of a body of effluent to be scraped off by a blade. However, it has been found that fine solids in the grease can foul the contact between the blade and the wheel, making separation inefficient.

Applicants believe that none of the above separators operate satisfactorily when an insoluble or immiscible fluid mixture includes less-dense solids and/or buoyant solids. A particularly irksome problem includes the fouling of down stream equipment including lines and other fluid transmission hardware such as, for example, any down stream valves, pumps, flow controllers, flow meters, pressure regulators, fluid composition sensors and the like.

There is a need to provide a separator unit for insoluble or immiscible fluid mixtures including less-dense solids and/or buoyant solids that overcome the above problems with the prior art. More specifically, there is a need to provide a separator unit that at least minimizes and, preferably, eliminates fouling resulting from the interaction of the less-dense component and less-dense solids and/or buoyant solids.

SUMMARY OF THE INVENTION

The present invention satisfies the need for a separator unit that segregates an insoluble or immiscible fluid mixture including less-dense solids and/or buoyant solids into less-dense solids and/or buoyant solids, a less-dense component, and a denser component. The separator unit of the present invention includes a vessel containing a separation or segregation volume. The separator unit includes a ceiling or sloped surface(s) situated above the separation or segregation volume. The vessel of the separator unit typically includes an inlet end and an outlet end connected by a bottom and sidewalls. At each of the inlet and outlet ends, baffles may create inlet and outlet channels as well as defining the separating or segregation volume. The upper portion of the separation or segregating volume is bounded by the ceiling or sloped surface(s) between the baffles and sidewalls of the vessel. The ceiling or sloped surface(s) guide components of the immiscible or insoluble fluid mixture having a lower specific gravity or density toward at least one access line. The less-dense solids and/or buoyant solids that have a lower specific gravity or density are removed from the region proximate to the access line after a sufficient quantity has accumulated. Then, the less-dense component that has a lower specific gravity or density is removed from the region proximate to the access line after a sufficient quantity has accumulated. The simplicity of the separator unit adds to its serviceability. The apparatus according to the invention may relieve and even eliminate the fouling of down stream elements through the use of a flushing cycle in one instance, alternative access lines in another instance, or alternative access lines and flushing. That is, inclusion of hardware that permits flushing of the access line and other down stream equipment permits for the frequent and unencumbered service of the separator unit without the need for special tools or inordinate amounts of downtime.

BRIEF DESCRIPTION OF THE DRAWINGS

These and other features, aspects and advantages of the present invention will be better understood by those skilled in the art after a review of the following description, appended claims, and accompanying drawings where:

DETAILED DESCRIPTION OF THE PREFERRED EMBODIMENT

The present invention relates to a unit for separating an insoluble or immiscible fluid mixture 124 including less-dense solids and/or buoyant solids 144. The separator unit includes aspects for dispatching the less-dense solids and/or buoyant solids 144 separately from less-dense fluid 34. These aspects minimize and may even eliminate the fouling of elements of the unit and/or the system into which the unit has been incorporated.

Description of a Separator Unit

Figure 1:
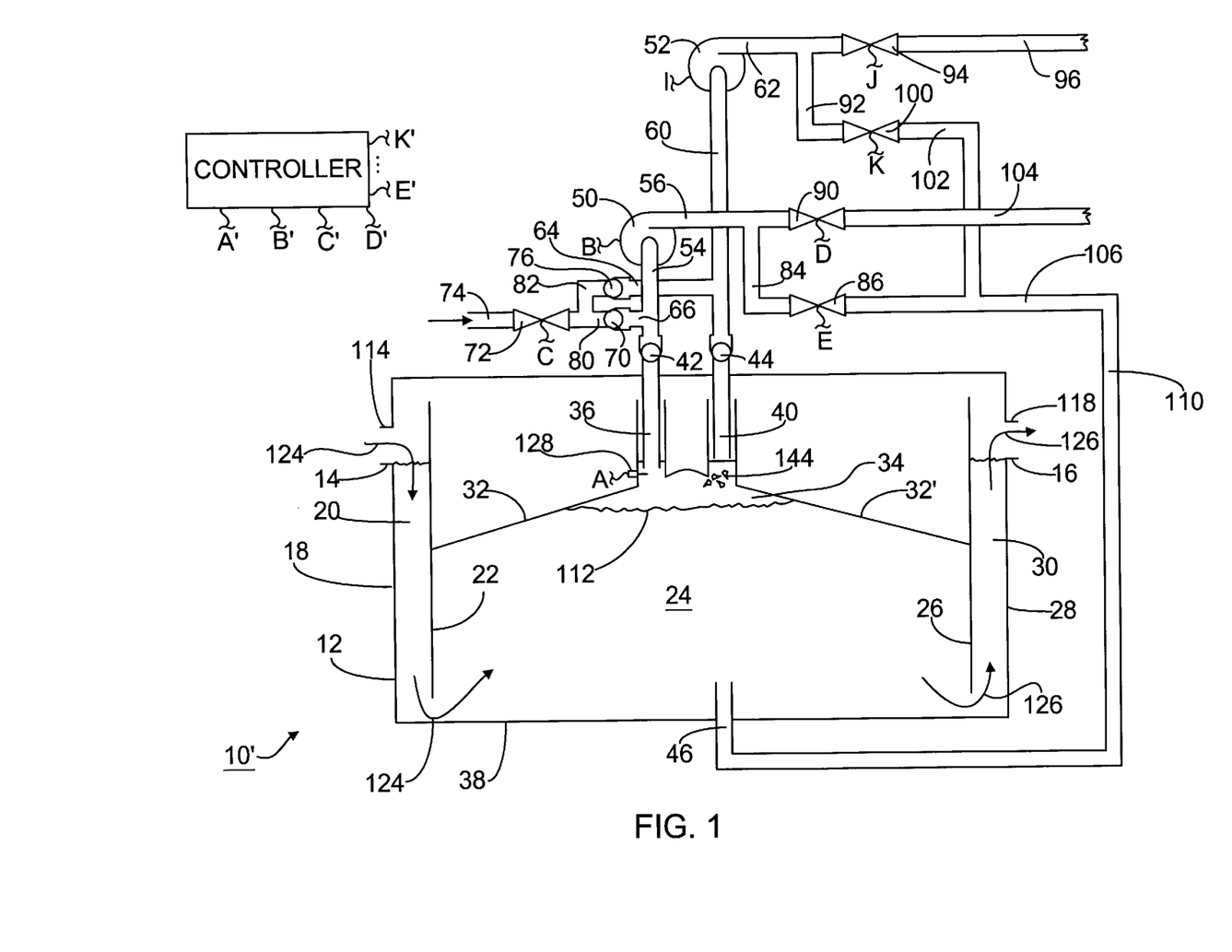
FIG. 1 depicts a cross-sectional schematic of the separator unit for separating an insoluble or immiscible fluid mixture including solids into its less-dense component and denser component while substantially removing less-dense solids and/or buoyant solids.

Depicted schematically in FIG. 1 is an aspect of the present invention that includes a separator unit 10 comprised of a vessel 12 including a ceiling or sloped surface(s) 32, 32'. Vessel 12 includes inlet end 18, outlet end 28 and bottom 38. An inlet baffle 22 and outlet baffle 26 lie within a volume bounded by ends 18 & 28 and wall(s) extending from bottom 38 and between ends 18 & 28.

Inlet baffle 22 and outlet baffle 26 bound a portion of a separation or segregation volume 24. Inlet baffle 22 extends from the tops of and between any extending wall(s) toward, but not to, bottom 38 to create an inlet channel 20 between the inlet baffle 22 and inlet end 18. Fluid communication between inlet channel 20 and separation or segregation volume 24 occurs through the opening below inlet baffle 22 above bottom 38. Inlet 14 is located in inlet end 18 to provide fluid communication between inlet line 114 and the inlet channel 20.

Similar to inlet baffle 22, outlet baffle 26 extends from the tops of and between any extending wall(s) toward, but not to, bottom 38 to create an outlet channel 30 between the outlet baffle 26 and outlet end 28. Fluid communication between outlet channel 30 and separation or segregation volume 24 occurs through the opening below outlet baffle 26 above bottom 38. Outlet 16 is located in outlet end 28 and provides for fluid communication between outlet line 118 and the outlet channel 30.

Ceiling or sloped surface(s) 32, 32' bound(s) an upper portion of separation or segregation volume 24. Access lines 36, 40 communicate with an elevated portion of ceiling or sloped surface(s) 32, 32'. Access lines 36, 40 provide a path through which any material in the uppermost section of separation or segregation volume 24 may be drawn. The material may include any one of a gas, a liquid, a solid, combinations of any two of the preceding together, and combinations of any three of the preceding together. In addition, access lines 36, 40 may act as a vent or vents to accommodate pressure equalization between the volume under and the volume above ceiling or sloped surface(s) 32, 32'.

The separator unit 10 preferably includes the piping circuit that is depicted in FIG. 1 as being external to vessel 12. The coordinated operation of the piping circuit with the separation process occurring within vessel 12 is discussed below with respect to the operation of the separator unit 10.

As depicted in FIG. 1, access line 36 fluidly communicates with a pump 50 through a check valve 42 and a suction line 54. The check valve 42 directs flow from access line 36 to suction line 54 and prevents flow in the opposite direction. The flushing fluid line 74 fluidly communicates with a suction line 54 through a valve 72, a first tie line 80, a check valve 70 and a bridge line 66. The check valve 70 directs flow from first tie line 80 to bridge line 66 and prevents flow in the opposite direction. The discharge from pump 50 may be directed to disposal line 104 or recycle/flush inlet 46 or both. When pump 50 fluidly communicates with disposal line 104, the communication occurs through discharge line 56 and a valve 90. When pump 50 fluidly communicates with recycle/flush inlet 46, the communication occurs through discharge line 56, a valve 86, a first recycle/flush bridge 106, and a recycle/flush line 110. Pump 50's simultaneous fluid communication with both disposal line 104 and recycle/flush inlet 46 may provide limited benefits.

Also as depicted in FIG. 1, access line 40 fluidly communicates with a pump 52 through a check valve 44 and a suction line 60. The check valve 44 directs flow from access line 40 to suction line 60 and prevents flow in the opposite direction. The flushing fluid line 74 fluidly communicates with suction line 60 through a valve 72, a second tie line 82, a check valve 76 and a bridge line 64. The check valve 76 directs flow from second tie line 82 to bridge line 64 and prevents the flow in the opposite direction. In addition, the discharge from pump 52 may be directed to disposal line 96 or recycle/flush inlet 46 or both. When pump 52 fluidly communicates with disposal line 96 that occurs through discharge line 62 and valve 94. When pump 52 fluidly communicates with recycle/flush inlet 46 that occurs through discharge line 62, valve 100, second recycle/flush bridge 102, and recycle/flush line 110. Pump 52's simultaneous fluid communication with both disposal line 96 and recycle/flush bridge 102 may provide limited benefits.

The separator unit 10 may include a controller unit having electrical or electronic communication with pumps 52 & 50, sensor 128, and valves 72, 86, 90, 94, and 100. This electronic or electrical communication may serve any of a number of functions including, for example the coordinated operation of the valves and pumps.

Description of a System Incorporating a Separator Unit

Figure 2:
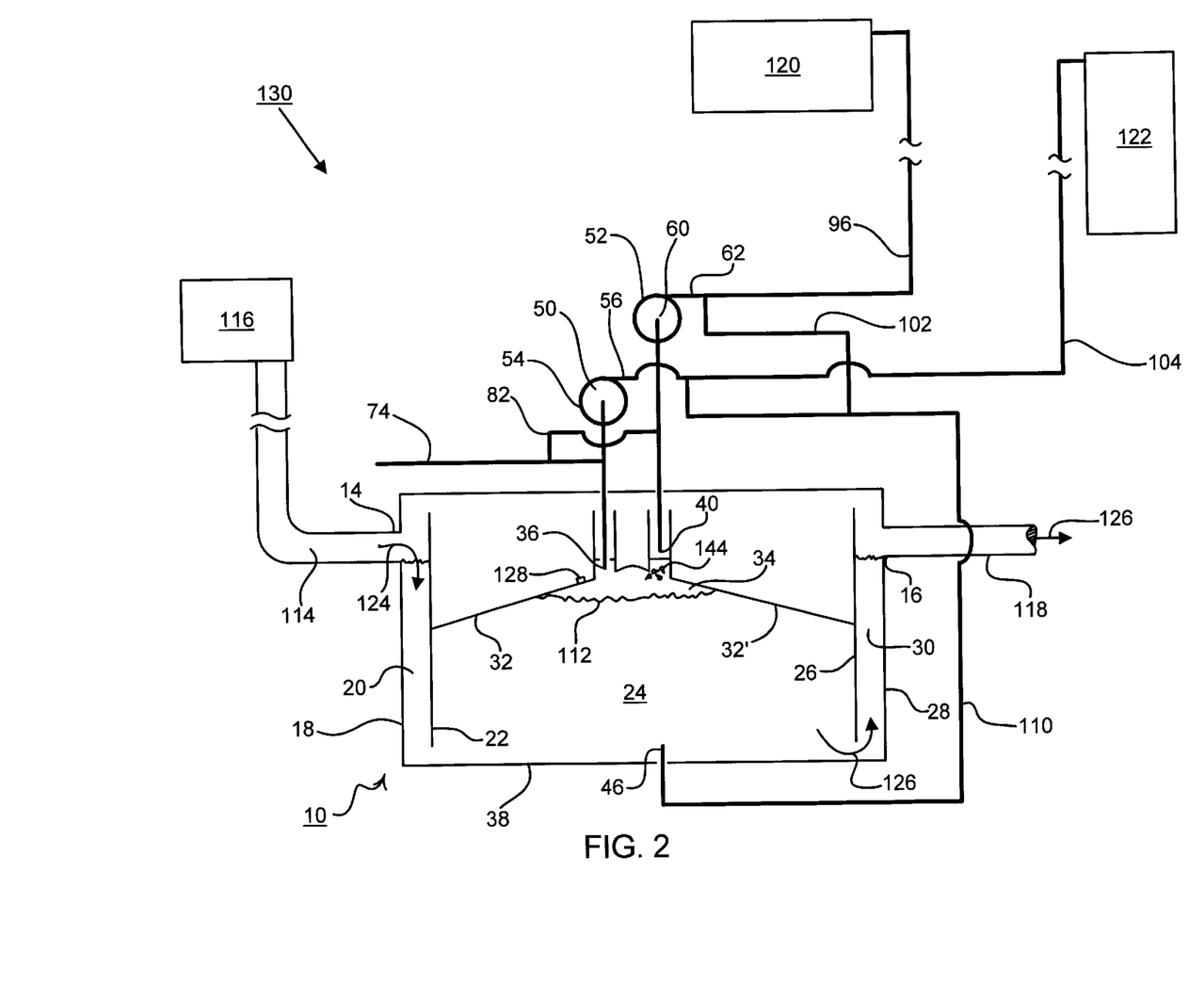
FIG. 2 depicts a schematic of a system incorporating the separator unit of FIG. 1 for separating an insoluble or immiscible fluid mixture including solids into its less-dense component and denser component while substantially removing less-dense solids and/or buoyant solids.

Another aspect of the present invention relates to the incorporation of the separator unit 10 of FIG. 1 into an operation 130 such as that depicted schematically in FIG. 2. The operation 130 includes a source 116 that supplies an insoluble or immiscible fluid mixture 124 including entrained less-dense solids and/or buoyant solids 144. The source may be any suitable source of the material to be separated. However, the source typically will be kitchen food preparation or ware washing operation coupled to a pulper. The source 116 fluidly communicates with the separator unit 10 through the inlet line 114. Operation 130 includes at least one retainer for a less-dense component 34 and, preferably at least two retainers—one retainer for storing a less-dense component 34, and a second retainer for storing the less-dense solids and/or buoyant solids 144. Either first retainer 120 or second retainer 122 depicted in FIG. 2 may be used for storing a less-dense component 34. Once one of the first retainer 120 and the second retainer 122 is designated for storing a less-dense component 34, the other retainer remains for storing the less-dense solids and/or buoyant solids 144. In a preferred aspect of the operation 130, the first retainer 120 is dedicated to the storage of less-dense solids and/or buoyant solids 144 and the second retainer 122 is dedicated to the storage of a less-dense component 34. A third or more retainers may be included in this aspect of the present invention for storing additional components such as one or more intermediate-density components and even the denser component 126.

Another aspect of the operation 130 relates to a controller unit and its electrical or electronic communication with pumps 52 & 50, sensor 128, and valves 72, 86, 90, 94, and 100. As noted above, the electronic or electrical communication may serve any of a number of functions including, for example, the coordinated operation of the valves 72, 86, 90, 94, and 100 and pumps 52 & 50.

Description of an Operation of a Separator Unit

Transient Operation

Following installation, separator unit 10 contains air, e.g., see FIGS. 1 and 2. During an initial transient period, insoluble or immiscible fluid mixture 124 is introduced into separator unit 10 through inlet 14 and inlet channel 20 from inlet line 114 and accumulates within the lower portion of vessel 12. Separation of a less-dense component 34 from a denser component 126 may begin to produce a separated layer of less-dense or buoyant solids 144 on less-dense component 34 and less-dense component 34 on denser component 126. The denser component 126 may extend from inlet end 18 to outlet end 28. Over time during this transient period as additional insoluble or immiscible fluid mixture 124 is introduced into separator unit 10, the separated layer eventually contacts the lower portion of ceiling or sloped surface(s) 32, 32'. The separated layers may be contained within separation or segregation volume 24 and extend from inlet baffle 22 to outlet baffle 26. Eventually, the volume of insoluble or immiscible fluid mixture 124 introduced into separator unit 10 is such that the separated layers are urged to the uppermost region of ceiling or sloped surface(s) 32, 32' and accumulates at access lines 36, 40. Any air that may have accumulated may be released through any of access lines 36, 40 to allow separated layer to communicate with access lines 36, 40. Alternatively, the apparatus may have air release ports or loose tolerances to permit air to escape as the liquid level rises.

The transient period might occur in a single step by introducing a volume of insoluble or immiscible fluid mixture 124 sufficient to fill inlet channel 20, separation or segregation volume 24, and outlet channel 30. In such a case, some insoluble or immiscible fluid mixture 124 may pass through separator unit 10 without segregating into the less-dense or buoyant solids 144, the less-dense component 34, and the denser component 126. To avoid the passing of unsegregated insoluble or immiscible fluid mixture 124 through separator unit 10, a volume of denser component 126 sufficient to fill inlet channel 20, separation or segregation volume 24, and outlet channel 30 to outlet line 118 may initially be introduced into separator unit 10.

Access lines 36, 40 may provide a path for gases that may accumulate adjacent to ceiling or sloped surface(s) 32, 32', to exit the uppermost section of separation or segregation volume 24. The gases may have been urged to the elevated end of ceiling or sloped surface(s) 32, 32'.

Steady State Operation

After initial filling, the insoluble or immiscible fluid mixture 124 including entrained less-dense solids and/or buoyant solids 144 continues to enter separator unit 10 through inlet line 114. Within separation or segregation volume 24, the denser component 126 segregates from less-dense component 34 and less-dense solids and/or buoyant solids 144. The denser component 126 proceeds below outlet baffle 26, through outlet 16, to outlet line 118 for eventual disposal, for example, to a sewer. The less-dense component 34 and less-dense solids and/or buoyant solids 144 accumulate at the upper end of ceiling or sloped surface(s) 32, 32' proximate to access lines 36, 40. The less-dense solids and/or buoyant solids 144 segregate from less-dense component 34 and may float on less-dense component 34. In an aspect of the present invention, pump 52 transfers the less-dense solids and/or buoyant solids 144 from the separator unit 10 to the first retainer 120. Once less-dense solids and/or buoyant solids 144 have been withdrawn, pump 50 transfers the less-dense component 34 from the separator unit 10 to the second retainer 122. The sensor 128 may be used to monitor the absence and/or presence of less-dense component 34.

The pumps 52 & 50 may be independently and/or selectively actuated by various means. The start of a pumping cycle may be initiated by a signal from the sensor 128 when less-dense component 34 reaches the level of the sensor 128. For example, a sensor 128 that monitors at least one characteristic of less-dense component 34 may be placed in the upper part of separation or segregation volume 24. An output signal may be initiated from the sensor 128 and sent to a controller unit that may in turn trigger a signal to actuate pump 52. Pump 52 may continue to run while less-dense component 34 is sensed for some preset period of time to remove less-dense solids and/or buoyant solids 144 from the surface of less-dense component 34. Then, pump 52 may be stopped and pump 50 actuated. Pump 50 may continue to run while less-dense component 34 is sensed or for some preset period of time to remove less-dense component 34. Alternately, the actuation of pumps 52 & 50 may be toggled by a timer or timers. Also, one or both of access lines 36, 40 to separator unit 10 may include a dip tube (not depicted) adjustably extending below ceiling or sloped surface(s) 32, 32' and into the separation or segregation volume 24 to facilitate pumping to a selected depth below ceiling or sloped surface(s) 32, 32'.

To assist the reader with an understanding of the operation of aspects of the present invention, Table 1 contains a summary of the state of components of the separator unit 10 during some steps of the operation 130. In particular, the state of valves 72, 70, 42, 86, 90, 76, 44, 94, and 100 and pumps 52 & 50 are summarized during: (1) the steady state discharge of denser component 126; (2) the discharge of less-dense solids and/or buoyant solids 144; (3) the discharge of less-dense component 34; and (4) the flushing of pumps 50 & 52. The denser component 126 may continue to discharge during the discharge of less-dense solids and/or buoyant solids 144 and/or the discharge of less-dense component 34. Since valves 70, 42, 76, and 44 are designated in FIGS. 1 & 2 as check valves, the term "inactive" is used to indicate that the flow checking feature of the valve may not be applicable. To indicate that the flow checking feature of valves 70, 42, 76, and 44 is applicable, the term "closed" is used to indicate that the valve is acting to prevent flow and the term "open" is used to indicate that the valve is acting to allow flow. Preferably, the controller is programmed to set the valves and pumps to these described states at appropriate times or in response to appropriate sensed conditions.

TABLE 1

Component State Summary for Separator Unit 10 of FIGS. 1 & 2

|  | Denser Component Discharge | Less-dense solids and/or buoyant solids Discharge | Less-dense component Discharge | Flushing of Pump 50 | Flushing of Pump 52 |
| --- | --- | --- | --- | --- | --- |
| Valve 72 | closed | closed | closed | open | open |
| Pump 50 | inactive | inactive | operational | operational | inactive |
| Valve 70† | inactive | closed | inactive | open | closed |
| Valve 42† | inactive | inactive | open | closed | inactive |
| Valve 86 | closed | closed | closed | open | closed |
| Valve 90 | closed | closed | open | closed | closed |

TABLE 1-continued

Component State Summary for Separator Unit 10 of FIGS. 1 & 2

|  | Denser Component Discharge | Less-dense solids and/or buoyant solids Discharge | Less-dense component Discharge | Flushing of Pump 50 | Flushing of Pump 52 |
|---|---|---|---|---|---|
| Pump 52 | inactive | operational | inactive | inactive | operational |
| Valve 76† | inactive | inactive | closed | closed | open |
| Valve 44† | inactive | open | inactive | inactive | closed |
| Valve 94 | closed | open | closed | closed | closed |
| Valve 100 | closed | closed | closed | closed | open |

†indicates that the valve is preferably a check valve

Denser Component 126 Discharge

The discharge of denser component 126 may occur without the assistance of any additional equipment as the operation 130 is schematically depicted in FIGS. 1 & 2. The states for the valves 72, 70, 42, 86, 90, 76, 44, 94, and 100 and pumps 52 & 50 during the discharge of denser component 126 are summarized in the second column of Table 1. Those skilled in the art will appreciate that outlet line 118 may include a pump in instances that the outlet 16 is at a level lower than the level of the entrance of an appropriate disposal.

Less-Dense Solids and/or Buoyant Solids 144 Discharge

The discharge of less-dense solids and/or buoyant solids 144 may occur with the assistance of pump 52 as the operation 130 is schematically depicted in FIGS. 1 & 2. The states for the valves 72, 70, 42, 86, 90, 76, 44, 94, and 100, and pumps 52 & 50 during the discharge of less-dense solids and/or buoyant solids Discharge 144 are summarized in the third column of Table 1. Those skilled in the art will appreciate that the discharge of less-dense solids and/or buoyant solids 144 may alternatively be accomplished using the piping circuit communicating with pump 50. In such a case, the states for the valves 72, 70, 42, 86, 90, 76, 44, 94, and 100, and pumps 52 & 50 in the third column of Table 1 would be altered to compensate for the difference.

Less-Dense Component 34 Discharge

The discharge of less-dense component 34 may occur with the assistance of pump 50 as the operation 130 is schematically depicted in FIGS. 1 & 2. The states for the valves 72, 70, 42, 86, 90, 76, 44, 94, and 100, and pumps 52 & 50 during the discharge of less-dense component 34 are summarized in the fourth column of Table 1. Those skilled in the art will appreciate that the discharge of less-dense component 34 may alternatively be accomplished using the piping circuit communicating with pump 52. In such a case, the states for the valves 72, 70, 42, 86, 90, 76, 44, 94, and 100, and pumps 52 & 50 in the fourth column of Table 1 would be altered to compensate for the difference.

Flushing of a Separator Unit

The present invention also provides a way to minimize or prevent the fouling of the piping circuits associated with the separator unit 10 and operation 130. The access lines 36, 40 and other fluid transmission hardware such as, for example, any down stream valves, pumps, flow controllers, flow meters, pressure regulators, fluid composition sensors and the like may become fouled with the less-dense solids and/or buoyant solids 144 or the less-dense component or both. This aspect of the invention is directed to a technique that may relieve and even eliminate the fouling of down stream elements through the use of a flushing cycle in one instance, alternative access lines in another instance, or alternative access lines and flushing. In the aspect of the present invention as depicted in FIGS. 1 & 2, one of the access lines 36, 40 is dedicated to the withdrawal of the less-dense solids and/or buoyant solids 144 and the other is dedicated to the withdrawal of the accumulated less-dense component 34. In addition to the dedication of access lines 36, 40 to particular tasks, flushing of the plumbing circuit associated with each following pump may provide additional benefits.

Flushing of Pump 50

The flushing of pump 50 may occur with the assistance of a flushing fluid provided to pump 50 through flushing fluid line 74 when the valve 72 is opened as the operation 130 is schematically depicted in FIGS. 1 & 2. The states for the valves 72, 70, 42, 86, 90, 76, 44, 94, and 100, and pumps 52 & 50 during the discharge of denser component 126 are summarized in the fifth column of Table 1. Those skilled in the art will appreciate that the flushing of pump 50 may occur in any manner that effects the reduction and even the elimination of the fouling of down stream elements. For example, the flushing of pump 52 might occur concurrently with the flushing of pump 50. In such a case, the states for the valves 72, 70, 42, 86, 90, 76, 44, 94, and 100, and pumps 52 & 50 in the fifth column of Table 1 would be altered to compensate for the difference.

Flushing of Pump 52

The flushing of pump 52 may occur with the assistance of a flushing fluid provided to pump 52 through flushing fluid line 74 when the valve 72 is opened as the operation 130 is schematically depicted in FIGS. 1 & 2. The states for the valves 72, 70, 42, 86, 90, 76, 44, 94, and 100, and pumps 52 & 50 during the discharge of denser component 126 are summarized in the sixth column of Table 1. Those skilled in the art will appreciate that the flushing of pump 50 may occur in any manner that effects the reduction and even the elimination of the fouling of down stream elements. For example, the flushing of pump 52 might occur concurrently with the flushing of pump 50. In such a case, the states for the valves 72, 70, 42, 86, 90, 76, 44, 94, and 100, and pumps 52 & 50 in the sixth column of Table 1 would be altered to compensate for the difference.

Description of an Alternative Separator Unit

Figure 3:
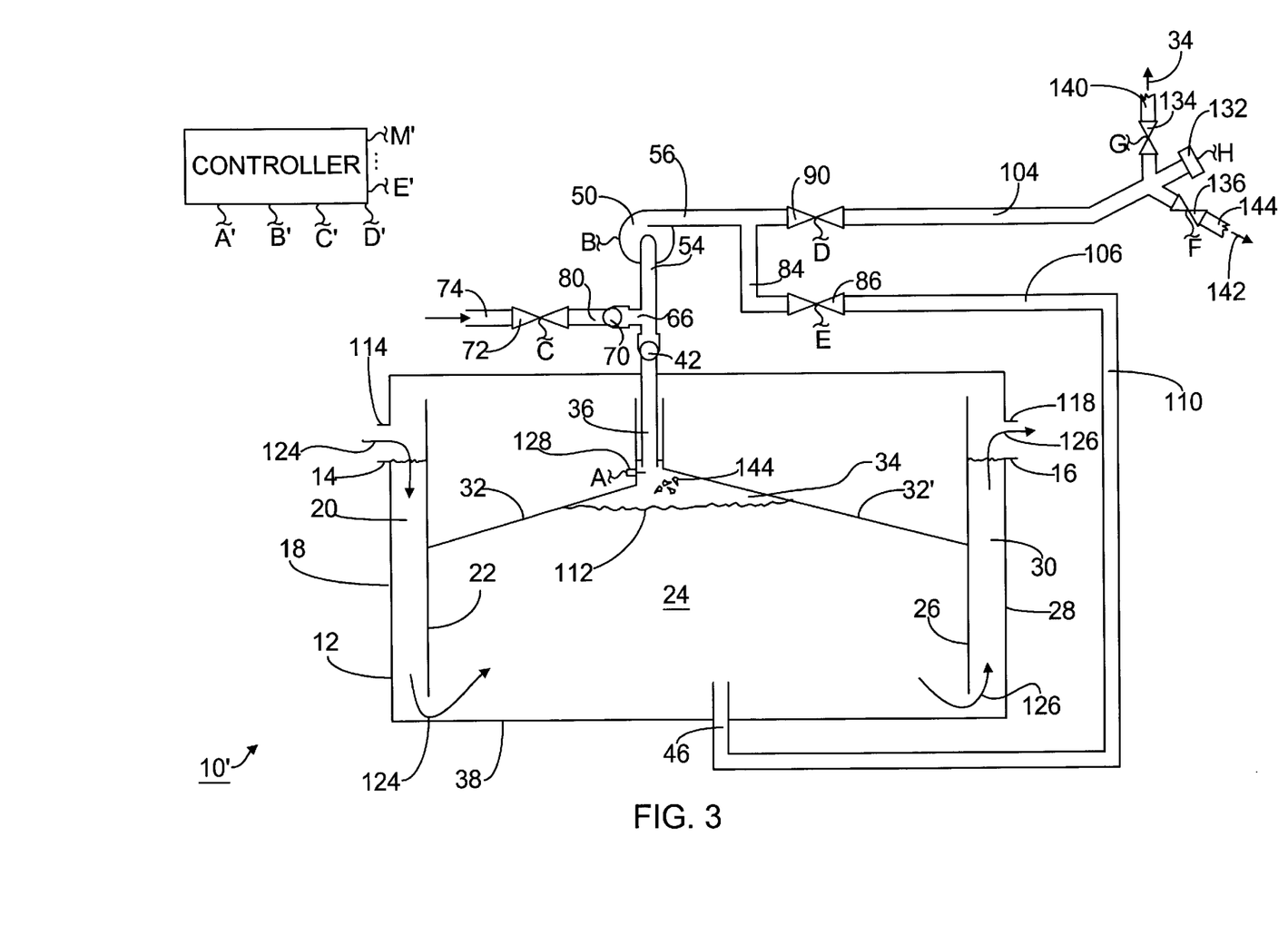
FIG. 3 depicts a cross-sectional schematic of the separator unit for separating an insoluble or immiscible fluid mixture including solids into its less-dense component and denser while substantially removing less-dense solids and/or buoyant solids.

Depicted schematically in FIG. 3 is an aspect of the present invention that includes an alternative separator unit 10'. The separator unit 10' of FIG. 3 differs from that of FIG.

1 in that a single access lines 36 communicates with an elevated portion of ceiling or sloped surface(s) 32, 32'. The access line 36 provides a path through which any material in the uppermost section of separation or segregation volume 24 may be drawn. The material may include any one of a gas, a liquid, a solid, combinations of any two of the preceding together, and combinations of any three of the preceding together. In addition, access lines 36 may act as a vent or vents to accommodate pressure equalization between the volume under and the volume above ceiling or sloped surface(s) 32, 32'. To that end, like elements in FIGS. 1, 2, 3, and 4 are designated by like numerals.

Another aspect of separator unit 10' relates to the piping circuit that is depicted in FIG. 3 as being external to vessel 12. The coordinated operation of the piping circuit with the separation process occurring within vessel 12 is discussed below with respect to the operation of the separator unit 10'.

As depicted in FIG. 3, access line 36 fluidly communicates with a pump 50 through a check valve 42 and a suction line 54. The check valve 42 directs flow from access line 36 to suction line 54 and prevents flow in the opposite direction. The flushing fluid line 74 fluidly communicates with a suction line 54 through a valve 72, a first tie line 80, a check valve 70 and a bridge line 66. The check valve 70 directs flow from first tie line 80 to bridge line 66 and prevents flow in the opposite direction. The discharge from Pump 50 may be directed to disposal line 104 or recycle/flush inlet 46 or both. When pump 50 fluidly communicates with disposal line 104, the communication occurs through discharge line 56 and a valve 90. When pump 50 fluidly communicates with recycle/flush inlet 46, the communication occurs through discharge line 56, a valve 86, a first recycle/flush bridge 106, and a recycle/flush line 110. Pump 50's simultaneous fluid communication with both disposal line 104 and recycle/flush inlet 46 may provide limited benefits.

Also depicted in FIG. 3, a less-dense component line 140 and a less-dense solids and/or buoyant solids line 142 may communicate with the access line 36 of separator unit 10' through the disposal line 104 and the pump 50. Each of the lines 140 and 142 may have corresponding valves 134 and 136, respectively. A probe of a sensor 132 reaches into disposal line 104 to detect the passage of a less-dense component/less-dense solids and/or buoyant solids interface. In a preferred embodiment, the sensor 132 includes a probe of a type that can sense the presence of less-dense component 34, as distinct from less-dense solids and/or buoyant solids 144, so that as the material passing by the probe transitions from less-dense solids and/or buoyant solids 144 to less-dense component 34, the interface is sensed.

Alternatively, valves 134 & 136 may be replaced by a valve that diverts the flow from disposal line 104 from the less-dense solids and/or buoyant solids line 144 to the less-dense component line 140 when the interface is sensed. That is, disposal line 104 may end into a valve that may divert flow in alternate directions. For example, the valve may comprise a body that includes an inlet from disposal line 104, a first branch or outlet to less-dense component line 140, and a second branch or outlet to less-dense solids and/or buoyant solids line 144. (See for example, U.S. application Ser. No. 09/439,542, filed in the names of William C. Batten and Bruce W. Kyles on Nov. 12, 1999, entitled "COMBINATION PUMP AND SEPARATOR, ESPECIALLY FOR COMMERCIAL KITCHENS," the disclosure of which is hereby incorporated by reference herein in its entirety).

Yet another aspect of the separator unit 10' relates to a controller unit and its electrical or electronic communication with pump 50, sensor 128, sensor 132, and valves 86, 90, 134, and 136. This electronic or electrical communication may serve any of a number functions including, for example the coordinated operation of the valves and pump, as set forth in Table 2 below.

Description of a System Incorporating an Alternative Separator Unit

Figure 4:
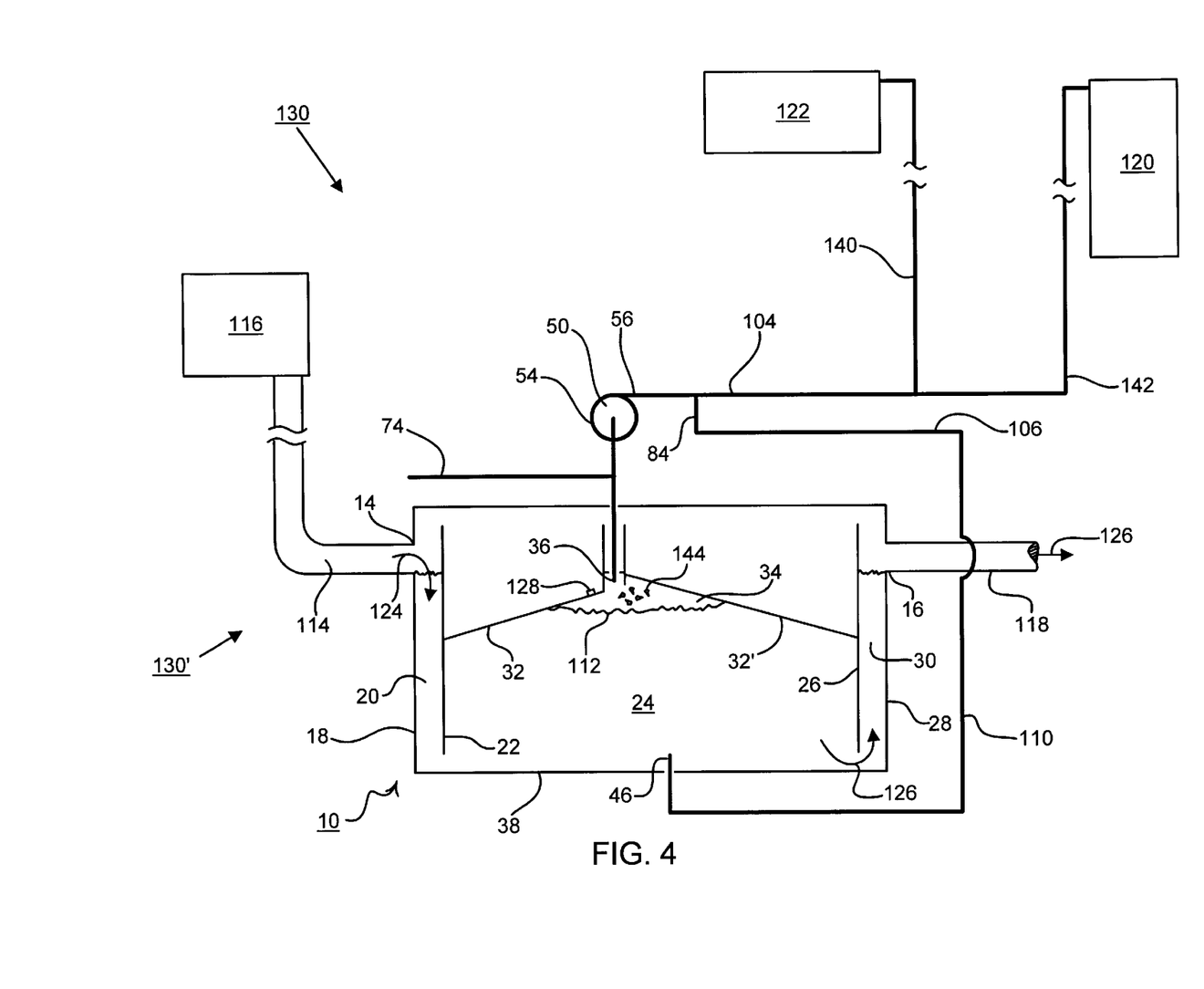
FIG. 4 depicts a schematic of a system incorporating the separator unit of FIG. 3 for separating an insoluble or immiscible fluid mixture including solids into its less-dense component and denser component while substantially removing less-dense solids and/or buoyant solids.

Another aspect of the present invent relates to the incorporation of the alternative separator unit 10' of FIG. 3 into an operation 130' such as that depicted schematically in FIG. 4. The operation 130' includes a source 116 that supplies an insoluble or immiscible fluid mixture 124 including entrained less-dense solids and/or buoyant solids 144. The source 116 fluidly communicates with the separator unit 10' through the inlet line 114. Operation 130' includes at least one retainer for a less-dense component 34 and, preferably at least two retainers—one retainer for storing a less-dense component 34, and a second retainer for storing the less-dense solids and/or buoyant solids 144. Either first retainer 120 or second retainer 122 depicted in FIG. 4 may be used for storing a less-dense component 34. Once one of the first retainer 120 and the second retainer 122 is designated for storing a less-dense component 34, the other retainer remains for storing the less-dense solids and/or buoyant solids 144. In a preferred aspect of the operation 130', the first retainer 120 is dedicated to the storage of less-dense solids and/or buoyant solids 144 and the second retainer 122 is dedicated to the storage of a less-dense component 34. A third or more retainers may be included in this aspect of the present invention for storing additional components such as one or more intermediate-density components and even the denser component 126.

Another aspect of the operation 130' relates to a controller unit and its electrical or electronic communication with pump 50, sensor 128, sensor 132 and valves 72, 86, 90, 94, and 100. This communication is depicted in FIG. 3, but not FIG. 4. As noted above, the electronic or electrical communication may serve any of a number functions including, for example the coordinated operation of the valves 72, 86, 90, 94, and 100, and pump 50.

Description of an Operation of an Alternative Separator Unit

Transient Operation

Aspects relating to the transient operation of the separator unit 10' substantially parallel those discussed above relating to the transient operation of separator unit 10. For that reason, applicants submit that one skilled in the art has the ability to correlate the transient operation of the separator unit 10' to obtain the transient operation of separator unit 10'.

Steady State Operation

After initial filling, the insoluble or immiscible fluid mixture 124 including entrained less-dense solids and/or buoyant solids 144 continues to enter separator unit 10 through inlet line 114. Within separation or segregation volume 24, the denser component 126 segregates from less-dense component 34 and less-dense solids and/or buoyant solids 144. The denser component 126 proceeds below outlet baffle 26, through outlet 16, to outlet line 118 for further processing. The less-dense component 34 and less-dense solids and/or buoyant solids 144 accumulate at the upper end of ceiling or sloped surface(s) 32, 32' proximate to access lines 36. The less-dense solids and/or buoyant solids 144 segregate from less-dense component 34 and may float on less-dense component 34. Pump 50 first transfers the less-dense solids and/or buoyant solids 144 from the separator unit 10 to the first retainer 120. Once less-dense solids and/or buoyant solids 144 have been withdrawn, pump 50 than transfers the less-dense component 34 from the separator unit 10' to the second retainer 122. The sensor 128 may be used to monitor the absence and/or presence of less-dense component 34.

The pump 50 may be independently and/or selectively actuated by various means. The start of a pumping cycle may be initiated by a signal from the sensor 128 when less-dense component 34 reaches the level of the sensor 128. For example, a sensor 128 that monitors at least one characteristic of less-dense component 34 may be placed in the upper part of separation or segregation volume 24. An output signal may be initiated from the sensor 128 and sent to a controller unit that may in turn trigger a signal to actuate pump 50. Pump 50 may continue to run while the less-dense component 34 is sensed or for some preset period of time to remove less-dense component 34. Alternately, the actuation of pump 50 may be toggled by a timer or timers. Also, access lines 36 to separator unit 10 may include a dip tube (not depicted) adjustably extending below ceiling or sloped surface(s) 32, 32' and into the separation or segregation volume 24 to facilitate pumping to a selected depth below ceiling or sloped surface(s) 32, 32'.

To assist the reader with an understanding of the operation of aspects of the present invention, Table 2 contains a summary of the state of components of the separator unit 10' during some steps of the operation 130'. In particular, the state of valves 72, 70, 42, 86, 90, 76, 134, and 136, and pump 50 are summarized during: (1) the steady state discharge of denser component 126; (2) the discharge of less-dense solids and/or buoyant solids 144; (3) the discharge of less-dense component 34; and (4) the flushing of pumps 50 & 52. The denser component 126 may continue to discharge during the discharge of less-dense solids and/or buoyant solids 144 and/or the discharge of less-dense component 34. Since valves 70 and 42 are designated in FIGS. 3 & 4 as check valves, the term "inactive" is used to indicate that the flow checking feature of the valve may not be applicable. To indicate that the flow checking feature of valves 70 and 42 are applicable, the term "closed" is used to indicate that the valve is acting to prevent flow and the term "open" is used to indicate that the valve is acting to allow flow.

TABLE 2

Component State Summary for Separator Unit 10' of FIGS. 3 & 4

|  | Denser Component Discharge | Less-dense solids and/or buoyant solids Discharge | Less-dense component Discharge | Flushing of Pump 50 |
|---|---|---|---|---|
| Valve 72 | closed | closed | closed | open |
| Pump 50 | inactive | operational | operational | operational |
| Valve 70† | inactive | inactive | inactive | open |
| Valve 42† | inactive | open | open | closed |
| Valve 86 | closed | closed | closed | open |
| Valve 90 | closed | open | open | closed |
| Valve 134 | closed | closed | open | closed |
| Valve 136 | closed | open | closed | closed |

†indicates that the valve is preferably a check valve

Denser Component 126 Discharge

The discharge of denser component 126 may occur without the assistance of any additional equipment as the operation 130' is schematically depicted in FIGS. 3 & 4. The states for the valves 72, 70, 42, 86, 90, 76, 134, and 136, and pump 50 during the discharge of denser component 126 are summarized in the second column of Table 2. Those skilled in the art will appreciate that outlet line 118 may include a pump in instances that the outlet 16 is at a level lower than the level of the entrance of subsequent operation 130'.

Less-Dense Solids and/or Buoyant Solids 144 Discharge

The discharge of less-dense solids and/or buoyant solids 144 may occur with the assistance of pump 50 as the operation 130' is schematically depicted in FIGS. 3 & 4. The states for the valves 72, 70, 42, 86, 90, 76, 134, and 136, and pump 50 during the discharge of less-dense solids and/or buoyant solids Discharge 144 are summarized in the third column of Table 2.

Less-Dense Component 34 Discharge

The discharge of less-dense component 34 may occur with the assistance of pump 50 as the operation 130' is schematically depicted in FIGS. 3 & 4. The states for the valves 72, 70, 42, 86, 90, 76, 134, and 136, and pump 50 during the discharge of less-dense component 34 are summarized in the fourth column of Table 2.

Flushing of an Alternative Separator Unit

Applicants note that a particularly preferred aspect of the present invention addresses minimizing or preventing the fouling of the piping circuits associated with the separator unit 10' and operation 130'. The access line 36 and other fluid transmission hardware such as, for example, any down stream valves, pumps, flow controllers, flow meters, pressure regulators, fluid composition sensors and the like may become fouled with the less-dense solids and/or buoyant solids 144 or the less-dense component 34 or both. This aspect of the invention is directed to a technique that may relieve and even eliminate the fouling of down stream elements through the use of a flushing cycle in one instance, alternative access lines in another instance, or alternative access lines and flushing. In the aspect of the present invention as depicted in FIGS. 3 & 4, one of the access lines 36 is dedicated to the withdrawal of the less-dense solids and/or buoyant solids 144 and the withdrawal the accumulated less-dense component 34. This dual dedication of access lines 36 may require an increased diligence in the flushing of the plumbing circuit after pumping to achieve the benefits of the present invention.

Flushing of Pump 50

The flushing of pump 50 may occur with the assistance of a flushing fluid provided to pump 50 through flushing fluid line 74 when the valve 72 is opened as the operation 130' is schematically depicted in FIGS. 1 & 2. The states for the valves 72, 70, 42, 86, 90, 76, 44, 94, and 100, and pumps 52 & 50 during the discharge of denser component 126 are summarized in the fifth column of Table 1. Those skilled in the art will appreciate that flushing of pump 50 may occur in any manner that effects the reduction and even the elimination of the fouling of down stream elements. For example, the flushing of pump 52 might occur concurrently with the flushing of pump 50. In such a case, the states for the valves 72, 70, 42, 86, 90, 76, 44, 94, and 100, and pumps 52 & 50 in the fifth column of Table 1 would be altered to compensate for the difference.

Some Contemplated Variations

Applicants contemplate that the separator units 10 & 10', vessel 12 and ceiling or sloped surface(s) 32, 32' may include alternative designs including those disclosed in U.S.

application Ser. No. 09/439,900, filed in the names of William C. Batten and Bruce W. Kyles on Nov. 12, 1999, entitled "READILY SERVICEABLE SEPARATOR UNIT WITH A FOCUSING PLATE," the subject matter of which is hereby incorporated herein in its entirety.

The valves of the separator units 10 & 10' may be any suitable type. In the case of valves in electronic or electrical communication with a controller, a particularly useful valve type is a solenoid valve. A solenoid valve may be used for valves 72, 86, 90, 94, and 100 in separator unit 10 and valves 72, 86, 90, 134, and 136 in separator unit 10'. Solenoid valves appropriate for use in a pump of the preset invention include those commercially available from industrial suppliers such as W.W. Grainger, Inc. Other valves that may be opened and closed by using alternate methods such as mechanical, electrical, electronic, electromechanical, and the like are within the scope of the present invention. As with solenoid valves, these alternative valves may be commercially available from industrial suppliers such as W.W. Grainger, Inc., and may include valves operated by a stepper motor. Another valve type that may be useful is a pinch valve such as that disclosed in U.S. Pat. No. 4,924,072 issued May 8, 1990, in the name of G. Robert Oslin, assigned on its face to Delaware Capital Formation, Inc., and entitled "Humidity Control for Oven Chamber", at column 6, lines 28–36.

The valves 42, 44, 70, and 76 of the separator units 10 & 10' may be any type that achieves the goal of aspects of the present invention. A particularly useful valve type is a check valve. The check valves may be placed in the piping circuit to direct the flow of, for example, among other components, the less-dense component 34, the less-dense solids and/or buoyant solids 144, and the flushing fluid as discussed above. A commercially available check valve type is that known as a duckbill check valve available from, for example, Linatex Inc., having its U.S. headquarters in Gallatin, Tenn. Also, check valves are commercially available from industrial suppliers such as W.W. Grainger, Inc.

The pumps 52 & 50 of the separator units 10 & 10' may be any suitable type. Numerous suitable pumps are commercially available from industrial suppliers such as W.W. Grainger, Inc. Such commercially available pumps include, for example, centrifugal, diaphragm, piston, rotary vane, plunger, and the like. Another pump that may be useful is that disclosed in U.S. application Ser. No. 09/567,778, filed in the names of Bruce W. Kyles and William C. Batten on May 9, 2000 and entitled "FLUID MOTIVATED PUMP," the disclosure of which is hereby incorporated by reference herein in its entirety.

Controllers may be any type that achieve the goal of the separator units 10 & 10' according to aspects of the present invention. A controller may run the spectrum from simple manual control though mechanical, electromechanical to complex computer programmed logic control (PLC). Particularly useful controllers include time circuits and microprocessor circuits. The pump(s) and/or valves may be selectively actuated by timers or various other methods. For example, a fluid composition sensor may sense the less-dense component 34 or the less-dense component 34/ less-dense solids and/or buoyant solids 144 interface and output a signal to actuate the pump(s) and/or valves in the piping circuits. Alternately, a timer may toggle the pump(s) and/or valves. In addition, the pump(s) and/or valves actuation may be triggered by sensing that the (less-dense component 34/less-dense solids and/or buoyant solids 144) interface has completed its travel in one direction or another. A mechanical and/or electrical linkage to accomplish this result is within the scope of this invention.

Although separator units 10 & 10' in FIGS. 1, 2, 3 & 4 are depicted as occupying a substantially rectangular prismatoid, it will be appreciated by those skilled in the art that any shape that accomplishes the separation of the insoluble or immiscible fluid mixture 124 into its component may be used. For example, vessel 12 might be a cylinder having an irregular cross-section or a regular cross-section, such as for example, circular, elliptical, polygonal, etc. Likewise ceiling or sloped surface(s) 32, 32' may also be any shape that substantially corresponds to the shape of vessel 12 and accomplishes separation. Ceiling or sloped surface(s) 32, 32' might advantageously possess a shape that directs less-dense component 34 to the volume substantially below access lines 36, 40. For example, if the volume defined by inlet baffle 22 and outlet baffle 26 was circular, then ceiling or sloped surface(s) 32, 32' could be oval, elliptical or even conical or frusto-conical. The arcuate character of the ceiling or sloped surface(s) 32, 32' might then be used to accommodate access lines 36, 40, having the narrower end furthest from the bottom of vessel 12.

The present invention addresses a genuine need in the industry, namely, the separation of an insoluble or immiscible fluid mixture 124 including entrained less-dense solids and/or buoyant solids 144 into its component in a manner that minimizes and/or eliminates fouling that may otherwise result. Access lines 36, 40 reside within ceiling or sloped surface(s) 32, 32', simply dedicating one to the withdrawal or removal of the entrained less-dense solids and/or buoyant solids, and the other to the withdrawal or removal of the less-dense component 34 minimizing and/or eliminating fouling that may otherwise result. The access lines may also be positioned on sides of the vessel 12 or otherwise be supported so that their intakes are properly located to draw off the desired component when their associated pumps are activated. Alternatively, the use of the flushing cycle in the case that the single access line 36 operates to withdraw or remove both the entrained less-dense solids and/or buoyant solids and the less-dense component 34, minimizes and/or eliminates fouling that may otherwise result. Additionally, the use of the flushing cycles in the case that one of the access lines 36, 40 is dedicated to the withdrawal or removal of the entrained less-dense solids and/or buoyant solids, and the other is used to withdraw or remove the less-dense component 34, minimizes and/or eliminates fouling that may otherwise result. The ease with which access lines 36, 40 may be interchanged and cleaned or flushed provides the advantage of substantially little or no down time for repairs and replacements.

Separator units 10 & 10' may be advantageously used to separate grease/water mixtures into a grease component and gray water component in commercial food preparation operations. In such operations, source 116 of FIGS. 2 & 4 may include any equipment or process that produces or results in a grease/water mixture including entrained less-dense solids and/or buoyant solids 144. Examples of entrained less-dense solids and/or buoyant solids 144 may include wood pulp from, for example, paper, card board and the like; polymer or plastic materials such as cellular polymers, such as styrene foams (as for example expanded polystyrene also known as "Styrofoam" an early tradename of DOW) and urethane foams. Examples of equipment that perform processes that might result in grease/water mixtures with entrained less-dense solids and/or buoyant solids 144 include a sink or a dishwasher including a garbage disposal. Particularly in commercial operations, napkins, paper plates, paper trays, paper towels, plastic cups and the like are thrown inadvertently and sometimes deliberately into garbage disposals for digestion. Source 116 may include one or more of the above. In addition, commercial kitchens often have pulpers which grind up a wide variety of solids, dewater the solids (such as by centrifuging) and the source 116 may include such a pulper, discharging the removed water. The water will have entrained solids as well as oil and grease, since the pulper does not remove fine solids, or the liquid state oil or grease.

In commercial food preparation operations, the grease component may have a tendency to solidify at the normal operating temperature (e.g., substantially room temperature) of separator units 10 & 10'. Therefore, it may be advantageous to provide a heater (not depicted) in the vicinity of and/or along access lines 36, 40 to maintain the grease in a liquid state. In further regards to commercial food preparation operations, separator units 10 & 10' may be of any size that effectively segregates the grease component from the gray water component. For example, in one application, applicants contemplate that separator units 10 & 10' may be of a size that fits beneath a restaurant sink. In another application, the inventor contemplates that separator units 10 & 10' may be of a size such as a typical walk-in refrigerator. In yet another application, the inventors contemplate that separator units 10 & 10' may be of the size of an in-ground storage or septic tank.

Separation units 10 & 10' may be constructed from any materials that are compatible with the insoluble or immiscible fluid mixture 124 to be separated, as well as its less-dense component 34, its less-dense solids and/or buoyant solids 144, and denser component 126. In certain applications, the construction materials might also be dictated by industry and/or government standards. For example, in commercial food preparation operations, county and/or city health codes might need to be consulted and, in the case that the food products are being exported, foreign government health codes might need to be consulted. Notwithstanding the above, separator units 10 & 10', and their components might be constructed from metals; ceramics including concrete and moldable cements; polymers; composites based on metals, ceramics, and polymers; either partially, completely, or with combinations thereof. A preferred material is stainless steel.

The previously described versions of the present invention have many advantages, including allowing the separation of insoluble or immiscible fluids into their components. More particularly, the present invention is advantageous for use in separating grease/water mixtures particularly in commercial food preparation operations to relieve surcharges that might otherwise be charged by municipal authorities.

Although the preferred embodiments of the present invention have been described in considerable detail, other versions are possible. In particular, the specifics of the vessel and its intake and water outlet and baffles may be modified, as well as the shape of the holding tank or vessel itself and the shape of the ceiling on the tank, referred to previously as a sloping surface. In some embodiments it may be stepped or otherwise provided with ceiling height variations.

Examples of other uses include the separation of benzene/water mixtures in refining operations, the separation of oil/water mixtures within ships, the separation of other insoluble or immiscible fluid mixtures be they organic, inorganic or mixtures thereof. Therefore, the spirit and scope of the appended claims should not be limited to the description of the preferred versions herein.

All patents and other documents identified in the present application are hereby incorporated by reference.

We claim:

1. A separator unit for use in segregating an immiscible fluid mixture including at least one entrained less-dense solid or buoyant solid into the at least one entrained less-dense solid or buoyant solid, at least one less dense component and at least one denser component comprising:

a vessel comprising a bottom, an inlet and an outlet, at least one ceiling and at least one access line within the at least one ceiling, wherein the at least one ceiling is inclined with respect to the horizontal and the access line within the at least one ceiling is proximal to that portion of the at least one ceiling furthest from bottom; and at least one piping circuit comprising at least one pump having a pump inlet and a pump outlet, at least one flushing fluid source line including at least one flushing line valve, and at least one disposal line having a first end and a second end, wherein the pump inlet is in fluid communication with the at least one access line, the flushing fluid source line is in fluid communication with the access line in a location between the at least one ceiling and the pump inlet, the first end of the at least one disposal line is in fluid communication with the pump outlet and the second end of the at least one disposal line is directable so as to allow the fluid communication to a first location or the fluid communication to a second location or both.

2. The separator unit according to claim 1, further comprising at least one controller, wherein the controller is in electrical, fluid or contacting communication with the at least one pump.

3. The separator unit according to claim 2, wherein the at least one flushing line valve comprises a remotely actuatable valve in electrical communication with the at least one controller.

4. The separator unit according to claim 3, wherein the remotely actuatable valve comprises a solenoid valve.

5. The separator unit according to claim 2, wherein the controller includes a selection mechanism of a type of at least one of a manual type, mechanical type, electromechanical type, and electronic type.

6. The separator unit according to claim 5, wherein the controller comprises a programmable logic controller.

7. The separator unit according to claim 2, further including at least one sensor for detecting at least one characteristic of the at least one less-dense fluid, wherein the at least one sensor extends below the at least one ceiling proximal to that portion of the at least one ceiling furthest from the bottom and is in electrical communication with the at least one controller.

8. The separator unit according to claim 7, further including at least one additional sensor at a juncture of the additional branches, wherein the at least one additional sensor detects at least one characteristic of the at least one less-dense fluid and is in electrical communication with the at least one controller.

9. The separator unit according to claim 1, the at least one disposal line further comprising two branches and two valves, wherein a first branch includes a first valve in fluid communication with the first location and a second branch includes a second valve in fluid communication with the second location.

10. The separator unit according to claim 9, wherein the two valves comprise remotely actuatable valves in electrical communication with the at least one controller.

11. The separator unit according to claim 10, wherein the remotely actuatable valves comprise solenoid valves.

12. A separator unit for use in segregating an immiscible fluid mixture including at least one entrained less-dense solid or buoyant solid into the at least one entrained less-dense solid or buoyant solid, at least one less dense component and at least one denser component comprising:

(a) a vessel comprising a bottom, an inlet and an outlet, at least one ceiling and at least one access line within the at least one ceiling, wherein the at least one ceiling is inclined with respect to the horizontal and the access line within the at least one ceiling is proximal to that portion of the at least one ceiling furthest from bottom;

(b) at least one piping circuit comprising at least one pump having an inlet and an outlet, at least one flushing fluid source line including at least one flushing line valve, and at least one disposal line having a first end and a second end, wherein the inlet is in fluid communication with the at least one access line, the flushing fluid source line is in fluid communication with the access line in a location between the at least one ceiling and the inlet, the first end of the at least one disposal line is in fluid communication with the outlet and the second end of the at least one disposal line is directable so as to allow the fluid communication to a first location or the fluid communication to a second location or both; and (c) at least one additional piping circuit comprising at least one additional pump having a pump inlet and a pump outlet, the at least one flushing fluid source line including the at least one flushing line valve, and at least one additional disposal line having a first end and a second end, wherein the pump inlet is in fluid communication with the at least one additional access line, the flushing fluid source line is in fluid communication with the additional access line in a location between the at least one ceiling and the pump inlet, the first end of the at least one additional disposal line is in fluid communication with the pump outlet and the second end of the at least one additional disposal line is directable so as to allow the fluid communication to a third location or the fluid communication to a fourth location or both.

13. The separator unit according to claim 12, wherein the access line and the additional access line extend below the at least one ceiling.

14. The separator unit according to claim 13, wherein the access line extends below the at least one ceiling further than the additional access line extends below the at least one ceiling.

15. The separator unit according to claim 12, wherein the second and fourth locations are the same location.

16. The separator unit according to claim 15, wherein the same location comprises the separator unit.

17. The separator unit according to claim 12, further including at least four valves, wherein a first valve directs the flow of fluid in the at least one flushing fluid source line in a direction from the at least one flushing fluid source line to the access line, a second valve directs the flow of fluid in the at least one flushing fluid source line in a direction from the at least one flushing fluid source line to the additional access line, a third valve directs the flow of fluid in the access line in a direction from the at least one ceiling to the inlet, and a fourth valve directs the flow of fluid in the additional access line in a direction from the at least one ceiling to the pump inlet.

18. The separator unit according to claim 17, wherein the at least four valves comprise check valves.

19. The separator unit according to claim 12, the at least one disposal line further comprising two branches and valves, wherein a first branch including as first valve in fluid communication with the first location and a second branch including a second valve in fluid communication with the second location.

20. The separator unit according to claim 12, wherein the first location comprises a first reservoir and the third location comprises a second reservoir.

21. The separator unit according to claim 20, wherein the second location and fourth locations comprise the separator.

22. A separator unit for use in segregating an immiscible fluid mixture including at least one entrained less-dense solid or buoyant solid into the at least one entrained less-dense solid or buoyant solid, at least one less dense component and at least one denser component comprising:

(a) a vessel comprising a bottom, an inlet and an outlet, at least one ceiling and at least one access line within the at least one ceiling, wherein the at least one ceiling is inclined with respect to the horizontal and the access line within the at least one ceiling is proximal to that portion of the at least one ceiling furthest from bottom;

(b) at least one piping circuit comprising at least one pump having an inlet and an outlet, at least one flushing fluid source line including at least one flushing line valve, and at least one disposal line having a first end and a second end, wherein the inlet is in fluid communication with the at least one access line, the flushing fluid source line is in fluid communication with the access line in a location between the at least one ceiling and the inlet, the first end of the at least one disposal line is in fluid communication with the outlet and the second end of the at least one disposal line is directable so as to allow the fluid communication to a first location or the fluid communication to a second location or both;

(c) at least one additional piping circuit comprising at least one additional pump having a pump inlet and a pump outlet, the at least one flushing fluid source line including the at least one flushing line valve, and at least one additional disposal line having a first end and a second end, wherein the pump inlet is in fluid communication with the at least one additional access line, the flushing fluid source line is in fluid communication with the additional access line in a location between the at least one ceiling and the pump inlet, the first end of the at least one additional disposal line is in fluid communication with the pump outlet and the second end of the at least one additional disposal line is directable so as to allow the fluid communication to a third location or the fluid communication to a fourth location or both; and (d) at least one controller, wherein the controller is in electrical communication with the at least one pump and the at least one additional pump.

23. A system for use in the food preparation industry to handle a grease/water mixture including at least one less-dense solid or buoyant solid, the system comprising:

(a) a source of a grease/water mixture;

(b) a separator unit capable of separating the grease/water mixture into a grease component, a gray water component and the at least one less-dense solid or buoyant solid, the separator unit comprising a vessel including an inlet, an outlet, a first baffle, a second baffle and at least one sloped surface within the vessel between the first baffle and the second baffle and upwardly inclined from a first end proximate to the inlet to a second end proximate to the outlet so as to urge a grease component and the at least one less-dense solid or buoyant solid of the grease/water mixture to at least one access port within the sloped surface while diverting a gray water component of grease/water mixture to the outlet;

(c) a first retainer for storing the grease component;

(d) a second retainer for storing the at least one less-dense solid or buoyant solid;

(e) an inlet line for transmitting the grease/water mixture from the source to the separator unit, the inlet line facilitating communication between the source to the separator unit;

(f) an outlet line for directing the gray water component from the separator unit to a drain or a sewer line, the outlet line facilitating communication between the separator unit and the drain or the sewer line; and (g) an access line for alternatively directing the grease component from the separator unit to the first retainer and the at least one less-dense solid or buoyant solid from the separator unit to the second retainer, the access line facilitating communication between the separator unit and the first retainer and between the separator unit and the second retainer.

24. A system according to claim 23, wherein the source comprises one or more of a sink, a dishwasher, a cooker, a pasteurized, a blancher, an oven, a dryer, and a grille.

25. A method of converting a grease/water mixture into a grease component, a gray water component and at least one less-dense solid or buoyant solid, the method comprising:

directing a grease/water mixture to a separator unit through an inlet, past a first baffle to a separation zone upwardly bounded by a sloped surface;

permitting the grease component and the at least one less-dense solid or buoyant solid to gravitationally separate from the gray water component of the grease/water mixture and travel to a region of the sloped surface near an access port disposed on the sloped surface and extending there through;

retrieving the at least one less-dense solid or buoyant solid from the separator system through the access port;

storing the at least one less-dense solid or buoyant solid in a first retaining vessel;

retrieving the grease component from the separator system through the access port;

storing the grease component in a second retaining vessel; and disposing the gray water component in a sewer line.

26. A method according to claim 25, wherein the retrieving comprises pumping.

27. A method according to claim 26, further comprising bleeding off air that, either was initially within the separator unit or has become entrained in grease/water mixture during and subsequent to transmitting.

28. A commercial kitchen system comprising a pulper arranged to receive water and solids effluent generated in a commercial kitchen and to pulp the water and solids effluent and discharge dewatered solids along a first path and pulped effluent including water, oil/grease and fine, low density solids along a second path, and a separator for separating the water, oil/grease and fine low density solids components of pulped effluent comprising a tank having an effluent inlet in communication with the second path of the pulper, a ceiling including first ceiling areas higher than second ceiling areas so that as the water, oil/grease and low density solids stratify in the tank, oil/grease and low density solids float on the water to the first ceiling area in preference to the second ceiling area and low density solids float on the oil/grease to the first ceiling area in preference to the second ceiling area, a first tank outlet for the water, a second tank outlet for the oil/grease, and a third tank outlet for low density solids, whereby the water, oil/grease and low density solids leave the tank through their respective first, second and third outlets and are thereby separated from one another.

* * * * *